(12) United States Patent
Brinkley

(10) Patent No.: US 11,027,803 B1
(45) Date of Patent: Jun. 8, 2021

(54) UNIVERSAL LANDING GEAR ASSEMBLY

(71) Applicant: BooneDOX, Inc., Thomasville, NC (US)

(72) Inventor: Chad Brinkley, Thomasville, NC (US)

(73) Assignee: BooneDOX, Inc., Thomasville, NC (US)

( * ) Notice: Subject to any disclaimer, the term of this patent is extended or adjusted under 35 U.S.C. 154(b) by 0 days.

(21) Appl. No.: 16/576,865

(22) Filed: Sep. 20, 2019

Related U.S. Application Data

(60) Provisional application No. 62/768,223, filed on Nov. 16, 2018.

(51) Int. Cl.
*B63C 13/00* (2006.01)
*B63B 34/20* (2020.01)
*B63B 34/26* (2020.01)

(52) U.S. Cl.
CPC .............. *B63C 13/00* (2013.01); *B63B 34/20* (2020.02); *B60F 2301/04* (2013.01); *B63B 34/26* (2020.02)

(58) Field of Classification Search
CPC .. B63C 13/00; B60F 2301/00; B60F 2301/04; B63B 34/20; B63B 34/26; B60P 3/10
USPC ............................ 114/344; 280/414.1, 414.2
See application file for complete search history.

(56) References Cited

U.S. PATENT DOCUMENTS

| | | | | |
|---|---|---|---|---|
| 2,683,268 A | * | 7/1954 | Strayer | B63C 13/00 114/344 |
| 2,831,203 A | * | 4/1958 | Kanarr | B63C 13/00 114/344 |
| 2,865,031 A | * | 12/1958 | Maloney | B63C 13/00 114/344 |
| 3,295,864 A | * | 1/1967 | Norrby | B63C 13/00 280/414.1 |
| 3,982,292 A | * | 9/1976 | Johnson | B60F 3/0092 114/344 |
| 4,515,102 A | * | 5/1985 | Kury | B63C 13/00 114/344 |
| 7,527,013 B2 | * | 5/2009 | Bramson | B63C 13/00 114/344 |
| 8,495,966 B2 | * | 7/2013 | Lazarevic | B63C 13/00 114/344 |

FOREIGN PATENT DOCUMENTS

AU 2012100241 A4 * 4/2012

* cited by examiner

*Primary Examiner* — Ajay Vasudeva
(74) *Attorney, Agent, or Firm* — MacCord Mason PLLC

(57) ABSTRACT

A universal receiver for transporting a watercraft may include a first knuckle receiver attachable to the watercraft, an adapter repositionable within the knuckle receiver, and a wheeled support leg. Typically, the adapter is detachable from the support leg and includes a ridge to mate with a corresponding channel and recessed cavity in the receiver. The result is a wheel assembly to repositionably secure the support leg between a first position and at least a second position that is generally angular offset from the first position, thereby securing the leg and preventing rotation about the watercraft.

19 Claims, 16 Drawing Sheets

UNIVERSAL LANDING GEAR ASSEMBLY

This application claims the benefit of U.S. provisional application No. 62/768,223, filed Nov. 16, 2018, which is incorporated herein by reference in its entirety.

BACKGROUND

Field

The present disclosure relates generally to watercrafts and, more particularly, to a multipositionable, removable universal wheel device and assembly for transporting a watercraft along a surface that will not impede manipulation of the watercraft in an operable position.

Related Art

Traditional means of transporting a watercraft over a surface, i.e. land and the like, often includes the user turning the watercraft upside down and lifting it overhead. However, expanded recreational use of watercrafts has resulted in the addition of accessories and hardware that can be mounted on a watercraft especially for recreational purposes. Therefore, one concern with the updated and accessory-filed watercrafts is the difficulty and complications of transporting these watercrafts along a surface, for instance between a vehicle to the water and the like. Current options include bulky and inefficient permanent mounts. Further, these conventional approaches interfere with particular uses and are inefficient, difficult to maneuver.

Therefore, Applicant desires a universal landing gear system, device, assembly, and method in connection with a watercraft without the drawbacks presented by the traditional systems and methods.

SUMMARY

In accordance with the present inventions, a universal wheel assembly is provided for manipulating a watercraft. These inventions provide an improved hybrid unit that is convenient, efficient and safe for the user, particularly when used in both transporting along a ground surface and operating positions along a water, or the like, surface.

In one embodiment, a retractable wheel assembly that supports and transports a watercraft includes a receiver secured to an upper surface of the watercraft, the receiver comprising a plurality of extensions; an adapter repositionable within the receiver between a first position and at least a second position angular offset from the first position; and an elongated leg secured about the adapted and having a distal wheel.

In particular examples, the adapter is repositionable within a receiver's inner mating face. The adapter may include a first body having an inner cavity and at least one ridge. The adapter may include a pair of substantially perpendicular walls and a substantially planar top surface.

In certain examples, the elongated leg may include a proximate rail and an elbow adjacent a vertical portion. The elongated leg may include an axle. The elongated leg may extend downward below a waterline of the watercraft. Further, the elongated leg may align substantially parallel to a waterline, or similar plane of movement or the like, of the watercraft.

In particular examples, the receiver's inner mating face includes a channel and a plurality of recessed cavities extending along at least a portion of a length of the receiver. The device may include a mounting bracket adapted to mechanically attach the receiver to an upper surface of the watercraft. The adapter may be connectable to and disconnectable from the receiver, for instance the adapter may be positioned in the receiver prevents rotation of the elongated leg.

In one embodiment, a retractable wheel assembly to support and detach from a watercraft includes a knuckle receiver, adapter, and elongated leg. Typically, the knuckle receiver is secured to the watercraft and has an inner mating face, an exterior surface having a first, second, third, and fourth extensions, the first and second extensions opposing one another and the third and fourth extensions opposing one another, while the first and second extensions are substantially perpendicular to the third and fourth extensions. The assembly may include a recessed slot that is generally spaced between adjacent extensions. Typically, the adapter has a first body having an inner cavity and at least one ridge, a second body having an inner cavity and at least one ridge, and a fastener releasably securing the first body about the second body. Further, the elongated leg typically has a proximate rail that is generally secured between the first body and the second body and a distal rail to secure a wheel.

In one example, the adapter is repositionable within the knuckle receiver's inner mating face. The adapter may be repositionable about the inner mating face between a first position and at least a second position that is generally angularly offset from the first position. A fastener may releasably secure the first body, the second body, and the elongated leg. Further, the adapter ridge may protrude outward. The adapter ridge may include a substantially planar top surface. The adapter ridge may include a pair of substantially perpendicular walls. In addition, the device may have a plurality of ridges that are generally spatially offset from one another along a perimeter of the adapter.

In particular examples, the proximate rail includes an elbow adjacent a vertical portion. The distal rail may include an elbow adjacent a vertical portion. The distal rail may include an axle. The elongated leg may extend downward below a waterline of the watercraft. The elongated leg may align substantially parallel to a waterline of the watercraft. The elongated leg may align upward above a waterline of the watercraft.

In certain examples, the receiver's inner mating face includes a channel and a plurality of recessed cavities that are generally extending along at least a portion of a length of the receiver. The recessed cavities may be positioned along distinct circumferential locations of the channel. The receiver's recessed slot may extend radially along a length of the receiver. The receiver's recessed slot may include a closed bottom, opposing sides, and a substantially open face. The substantially open face may include a pair of recessed rails parallel to one another.

In particular examples, the device includes a mounting bracket to mechanically attach the knuckle receiver to an upper surface of the watercraft. In particular, the device may include pair of angled brackets. Further, the adapter may be connectable to and disconnectable from the knuckle receiver. The adapter may be positioned in the knuckle receiver prevents rotation of the elongated leg.

In certain examples, the device may include a central arm. Further, the adapter protrudes through an outer face of the receiver. The adapter may protrude through an outer face of the receiver at a plurality of different angular positions.

In another embodiment, a universal wheel assembly for transporting a watercraft includes a first knuckle receiver and a second knuckle, an adapter, and a pair of wheeled support legs. Typically, the first knuckle receiver and second knuckle receiver are spaced horizontally adjacent one another and are attachable to the watercraft. Typically, the adapter is repositionable within the knuckle receiver between a first position and at least a second position that is generally angularly offset from the first position. Further, the pair of wheeled support legs typically have a proximate portion that is generally affixed to the adapter and a distal portion supporting a wheel.

In one example, the adapter is separable from the wheeled support leg. The adapter may include a first body with an inner cavity and a second body with an inner cavity, whereby the first body and the second body receive the proximate portion. The assembly may include a fastener securing the first body about the second body. The fastener may protrude through the adapter and the proximate portion.

In certain examples, the adapter includes at least one ridge protruding outward. The assembly may include a plurality of ridges that are generally spatially offset from one another, for instance along a perimeter of the adapter. The ridge may include a substantially planar top surface that is generally adjacent a pair of walls to mate within the corresponding knuckle receiver.

In particular examples, the support leg includes an elbow that is generally adjacent the proximate portion and a vertical portion. The proximate portion may be substantially perpendicular to the vertical portion. The support leg may include an elbow that is generally adjacent the distal portion and a vertical portion. The proximate portion may be substantially parallel with the distal portion. The support leg may include an axle.

In some examples, the support leg extends downward, for instance below a waterline of the watercraft, in the first position to generally contact a surface. Further, the support leg may be aligned substantially parallel, for instance to a waterline of the watercraft, in the second position. Still further, the wheeled support leg may be aligned upward, for instance above a waterline of the watercraft, in the second position.

In certain examples, the knuckle receivers include an inner channel and a plurality of recessed cavities that are positioned along distinct circumferential locations of the channel. The knuckle receivers may include at least one outer slot extending radially to the channel. The knuckle receivers may include a plurality of outer slots that are generally extending the length of the knuckle receiver. The outer slot may include a closed bottom, opposing sides, and a substantially open face. Further, the substantially open face may include a pair of recessed rails that are generally parallel to one another.

In particular examples, the assembly includes a mounting bracket mechanically attached to an upper surface of the watercraft, and in some cases below the knuckle receiver. The assembly may include an angled bracket that is generally positionable about the mounting bracket. The adapter may be connectable to and disconnectable from the knuckle receiver. The adapter may be positioned in the knuckle receiver to prevent rotation of the support leg, for instance in the first position. The adapter may be positioned in the knuckle receiver to prevent rotation of the wheeled support leg in the second position.

In certain examples, the assembly includes a central arm that is generally extending between the first knuckle receiver and the second knuckle receiver. The first knuckle receiver and the second knuckle receiver may be positionable at different lengths of the central arm. For instance, the first knuckle receiver and the second knuckle receiver may be positionable at different lengths of the central arm, for example depending upon a beam dimension of the watercraft.

A further embodiment in a retractable wheeled watercraft includes a mounting system having a support leg and a receiver. The support leg typically has an adapter proximate portion including at least one ridge with a planar top surface separated by a pair of walls, and a wheeled distal portion. The receiver typically has a channel with a plurality of recessed cavities extending from the channel. Typically, the channel and recessed cavities matingly receive the support leg and ridge to prevent rotation of the support leg about the watercraft.

In one example, the adapter proximate portion is separable from the support leg. The adapter proximate portion may protrude through an outer face of the receiver into the channel and recessed cavity. Further, the adapter proximate portion may protrude through the outer face at a plurality of different angular positions.

In particular examples, the first position includes an extended position, and wherein a second position includes a retracted position that is generally angular offset from the first position. The adapter proximate portion may include a plurality of ridges that are separated from one another along opposing faces. The ridge's planar top surface may be substantially perpendicular to the pair of walls. The receiver's recessed cavities may align along distinct circumferential locations of the channel. The receiver may include an outer slot extending parallel to the channel. Still further, the adapter proximate portion may be generally connectable to and disconnectable from the receiver.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
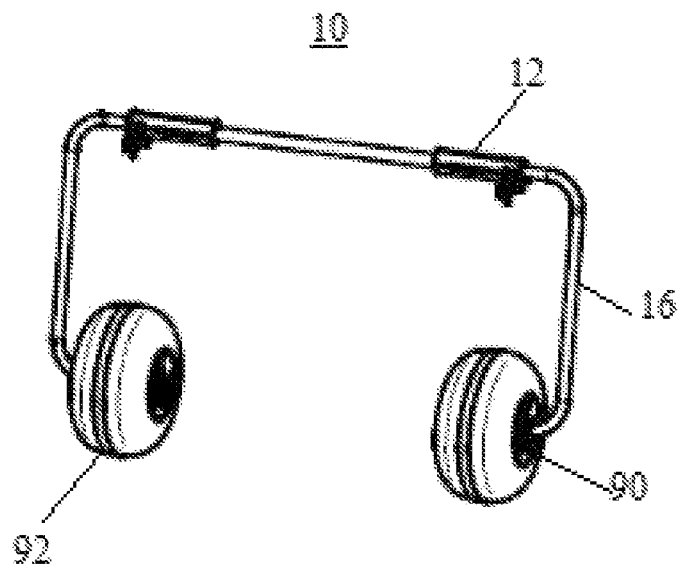
FIG. 1 is a perspective front view of a wheel assembly according to one embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
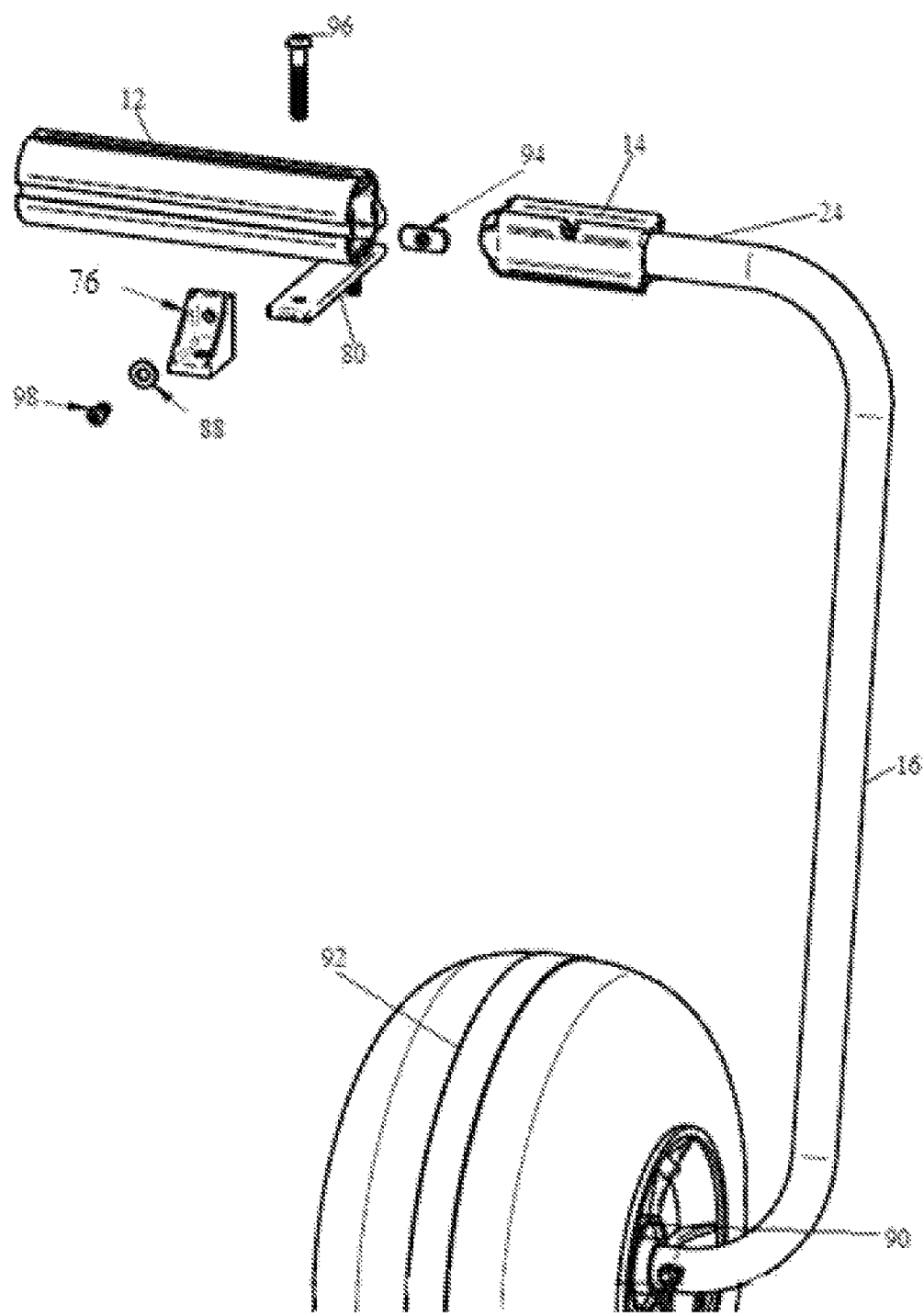
FIG. 2 is a front partially exploded view of isolated wheel assembly elements of the embodiment introduced in FIG. 1, with elements removed for clarity.

Referring now to the drawings in general and FIGS. 1 and 2 in particular, it will be understood that the illustrations are for the purpose of describing embodiments of the disclosure and are not intended to limit the disclosure or any inventions thereto. As best seen in FIG. 1, the universal wheel assembly 10 includes at least one wheeled leg connectable to and disconnectable about receiver(s) 12, which is generally attachable to a watercraft for upright transport along a surface, including, but not limited to, land, hardened aquatic surfaces, partially aquatic surfaces, and the like. FIG. 1 introduces an assembly having two wheeled leg assemblies 16 with a pair of corresponding mounting receivers 12, however other embodiments may include a single and more than two associated wheel leg assemblies and receivers. Further, as shown and described herein, any watercraft may include a kayak, canoe, boat, other water vehicle, and in alterative embodiments, semi land and land vehicles.

Figure 1A:
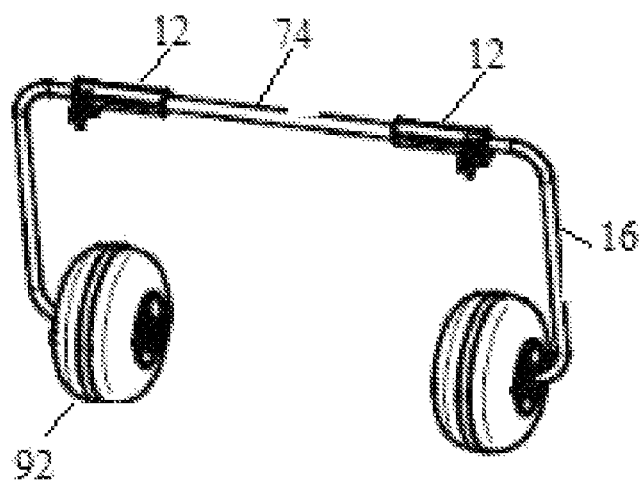
FIG. 1A is a perspective rear view of the wheel assembly embodiment of FIG. 1.

Universal wheel assembly 10 may be positioned, relative the watercraft on which it is mounted, in any variety of extended and retracted positions to match the desired application and/or environmental factors. As shown in FIGS. 1 and 1a, wheeled leg portions may be extended downward in a second operating position, wherein wheels 92 extend downward from the upper receiver 12 and central bar 74. In this extended position, the wheel 92 may extend down below the keel or lower surface of a watercraft. As illustrated, the retractable wheel assembly may be mounted on an axle 90, however those skilled in the art having the benefit of this disclosure will recognize additional/alternative transporting features, including, but not limited to rollers and the like.

Figure 1B:
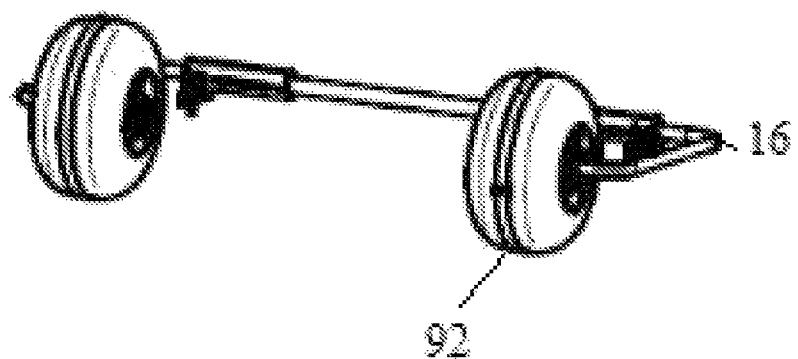
FIG. 1B is a perspective front view of the wheel assembly embodiment of FIG. 1 in a second position.
Figure 1C:
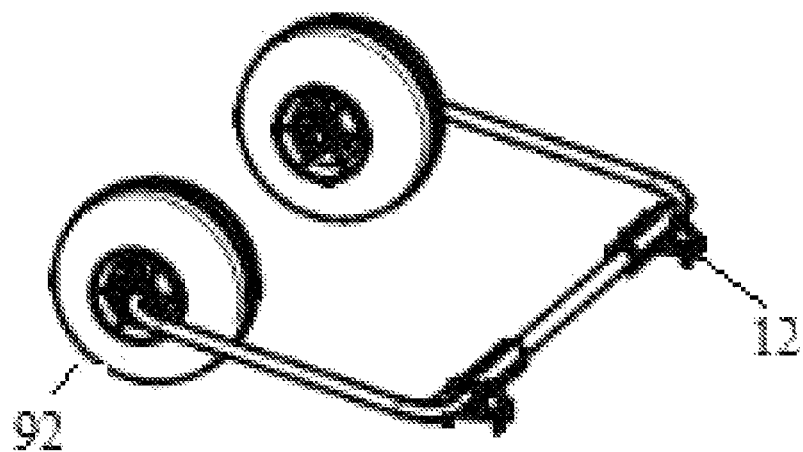
FIG. 1C is a perspective top view of the wheel assembly embodiment of FIG. 1 in a second position.
Figure 9:
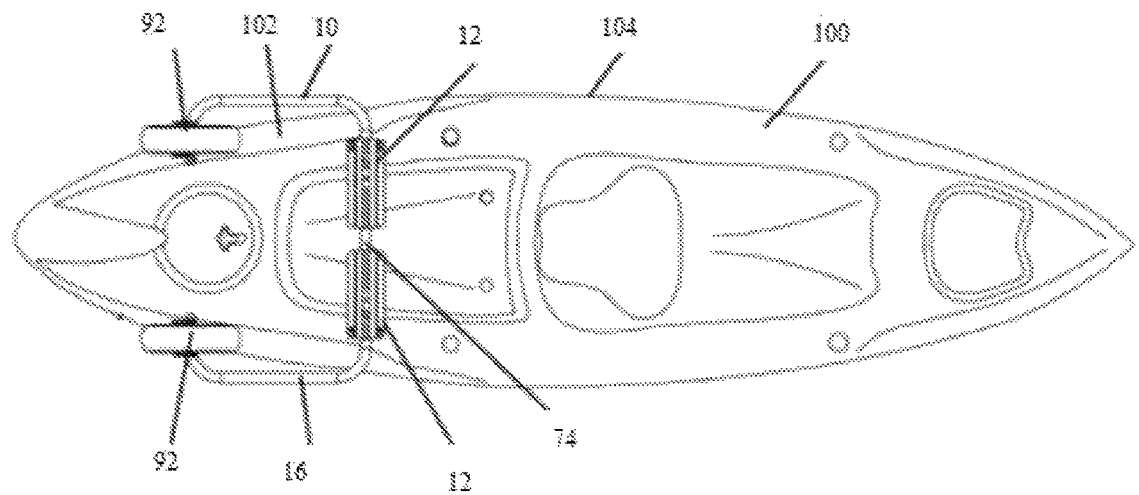
FIG. 9 is a top view of a watercraft assembly according to an embodiment of the disclosure.
Figure 10:
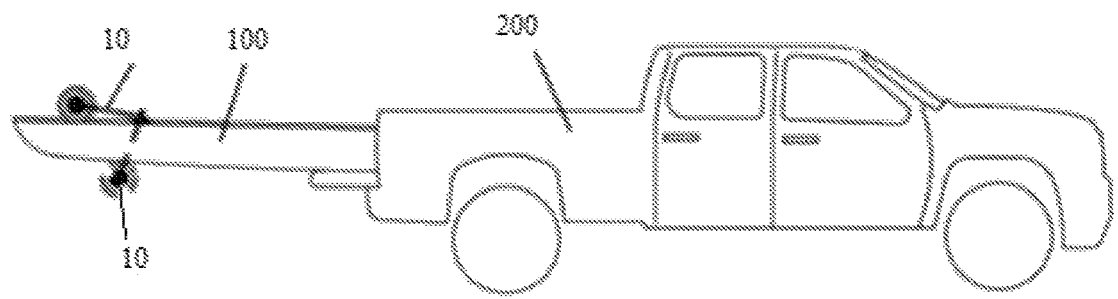
FIG. 10 is a side view of a watercraft assembly in a towage position according to an embodiment of the disclosure.

As illustrated in FIGS. 1B and 1C, in a retracted position the wheels 92 may be raised, for instance relative to a waterline of the watercraft. As later shown in FIG. 9, the waterline 104 may be aligned along the widest part of the watercraft 100, however the waterline may not coincide with the maximum extent of the beam. In this retracted position, the wheeled legs are raised above the deck 102, or deck section, out of the water, so as to not interfere or impede with movement of the watercraft through the water, or the like. Further, the universal wheel assembly 10 in the retracted position eases transport, for instance about narrow passages, between doorways, and about obstacles, improves storage, allows convenient site-specific maneuverability between and about a vehicle 200 as shown in FIG. 10, and facilitates shipment, and the like.

Figure 1D:
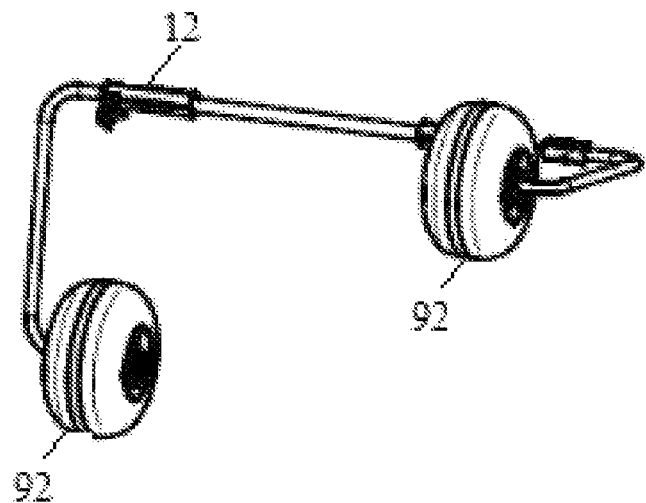
FIG. 1D is a perspective front view of the wheel assembly embodiment of FIG. 1 in a second position.
Figure 1E:
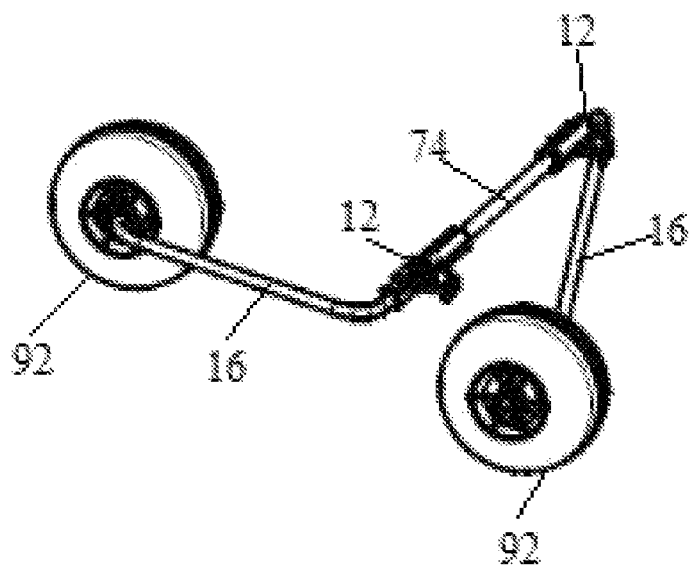
FIG. 1E is a perspective side view of the wheel assembly embodiment of FIG. 1 in a second position.

FIGS. 1D and 1E show an embodiment of the universal wheel assembly 10 in a second position, wherein one wheel 90 is positioned in an extended position while the opposing wheel is positioned in a generally retracted position. Those of ordinary skill in the art having the benefit of this disclosure will recognize additional and alternative wheel orientations in a second position as within the spirit of this disclosure.

Figure 1F:
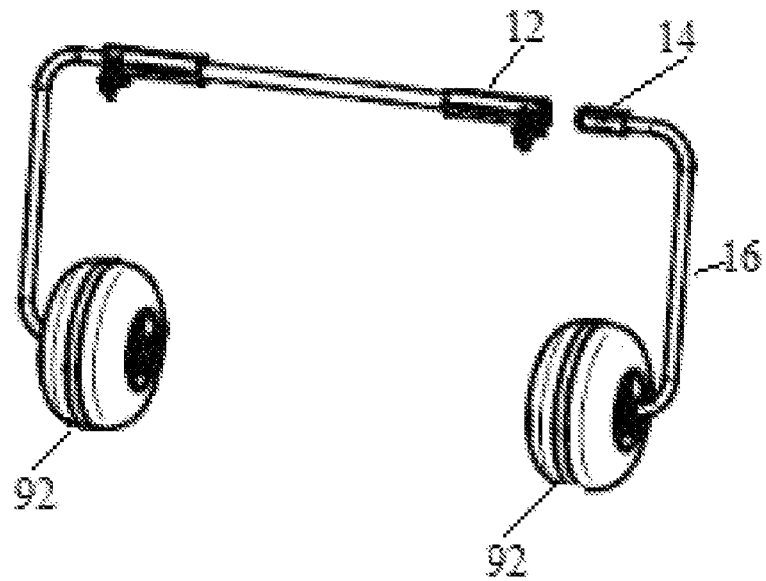
FIG. 1F is a perspective front view of the wheel assembly embodiment of FIG. 1 in a partially retracted position.
Figure 1G:
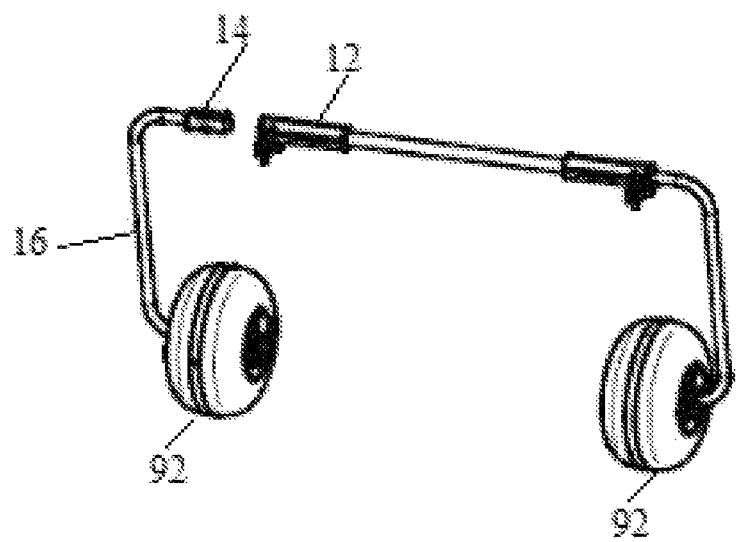
FIG. 1G is a perspective front view of the wheel assembly embodiment of FIG. 1 in a partially retracted position.

FIGS. 1F and 1G illustrate one embodiment of the universal wheel assembly in a semi-detached position, wherein one wheeled leg 16 is generally removed from the universal wheel assembly as shown and described herein. However, it is within the spirit of this disclosure for universal wheel assembly to be configured in a variety of interchangeable arrangements for mounting to and removable from a variety of particular watercrafts.

Figure 2A:
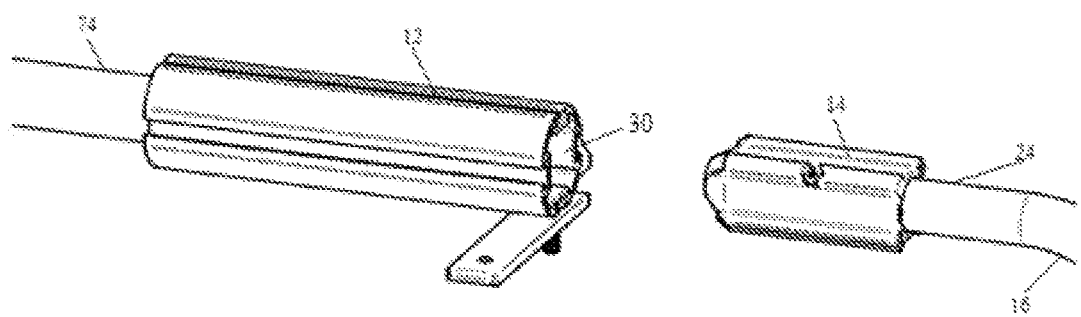
FIG. 2a is a front partially exploded view of isolated wheel assembly elements of the embodiment introduced in FIG. 1, with elements removed for clarity.

FIGS. 2 and 2A introduce an embodiment of the universal wheel assembly having a knuckle receiver 12, an adapter 14 repositionable within channel 30 of knuckle receiver 12, and a wheeled support leg 16 affixed to adapter 14. Receiver 12 may be secured to the watercraft, for instance along an upper face of the deck, in a variety of configurations, including through direct fastening, adhesives, welds, or via bracket(s). As shown in FIG. 2, a mounting bracket 80 may include a backing plate aligned below and mechanically attaching receiver 12 about the watercraft, for instance via fastener(s), including mounting bolts 98, tension bolts, set screws, nut 94, washers, mechanical fasteners, adhesives, welds, and the like. Further, an angled bracket 76 may be positionable relative to bracket 80 for mechanically securing receiver 12 about the watercraft. Any of the mounting brackets may be used singularly or combined, and at least two identical bracket assemblies may be positioned on symmetrically adjacent sides of the watercraft.

Each wheel subassembly generally includes a wheel 92 and an elongated support member or leg 16 on which wheel 92 is mounted. In particular examples, the wheel 90 is mounted on an axle 92 at a distal end of the leg, wherein the wheel 92 is free to rotate relative to axle 92 and conventional bearings as understood by those skilled in the art having the benefit of this disclosure. The elongated support leg 16 may be constructed out of any material, single piece or multi piece joined together arrangements, dimensions, and geometry. Particular examples include metal fabricated tubular members, for instance having a U-shape, C-shape, and the like.

Figure 3:
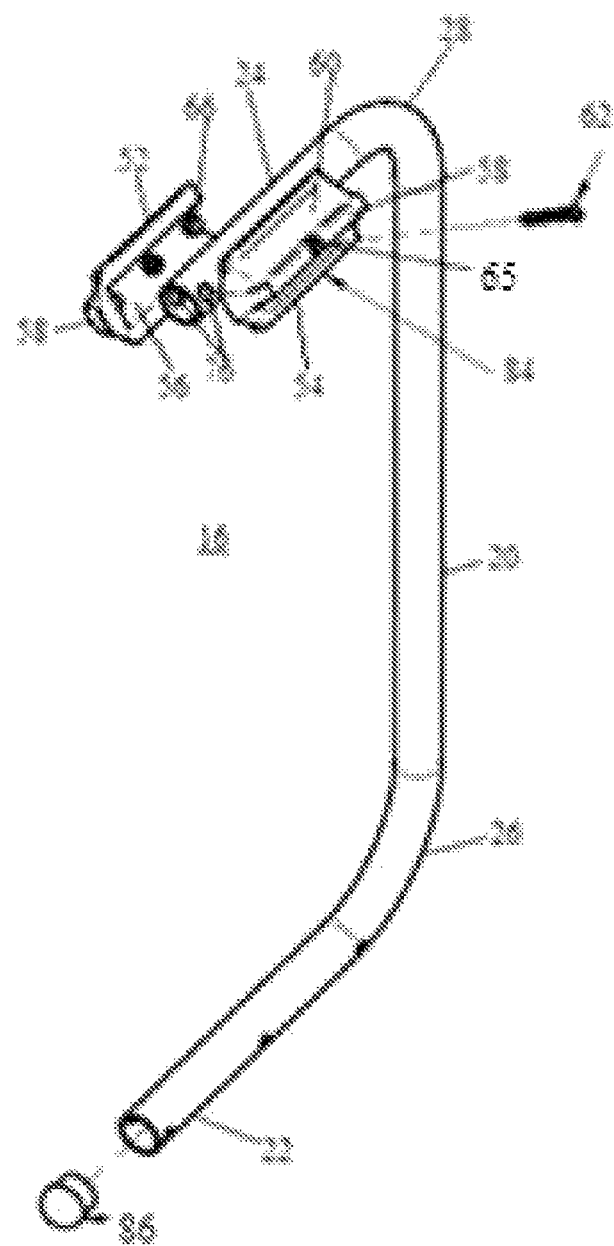
FIG. 3 is an isolated perspective front view of one embodiment of an adapter and elongated leg introduced in FIG. 1, with elements omitted for clarity.

FIG. 3 introduces one embodiment of a wheel support leg 16 having a proximate portion 24 removably affixed to the adapter. Support leg 16 may include an elongated vertical portion 20 separating proximate portion 24 and distal portion 22. Further, support leg may include a lower elbow 26 adjacent distal portion 22. In addition, support leg may include an upper elbow 28 adjacent proximate portion 24. As shown, the proximate portion 24 may be substantially parallel with distal portion 22. Further, proximate portion 24 may be substantially perpendicular with vertical portion 20, while distal portion 22 may be substantially perpendicular with vertical portion 20 to maintain the rotational clearance relationship of the universal wheel assembly and watercraft as shown and described herein.

As illustrated in FIG. 3, the adapter may be separable from the wheeled support leg, for instance as a predetermined failure point during use and the like. In particular, Applicant has unexpectedly discovered the replaceable, multi-element adapter provides an isolated breakage structural point, mechanical fuse, and enhanced adaptability of the assemblies. As shown, first body 52 may have an inner cavity 56 and second body 54 may have an inner cavity, wherein in a mated position the cavity(s) receive proximate portion 24. In particular examples, fastener(s) 62 secure first body 52 about second body 54, while other examples include alternative molded combinations, welds, and the like. As shown in FIG. 3, fastener(s) 62 may protrude through openings 76 in the proximate portion 24 through aperture 60 in first body 52 and into fastener 66 of second body 54. Further, a tube enclosure 86 may enclose distal portion 22 mateable within a wheel, axle, and the like.

Figure 4:
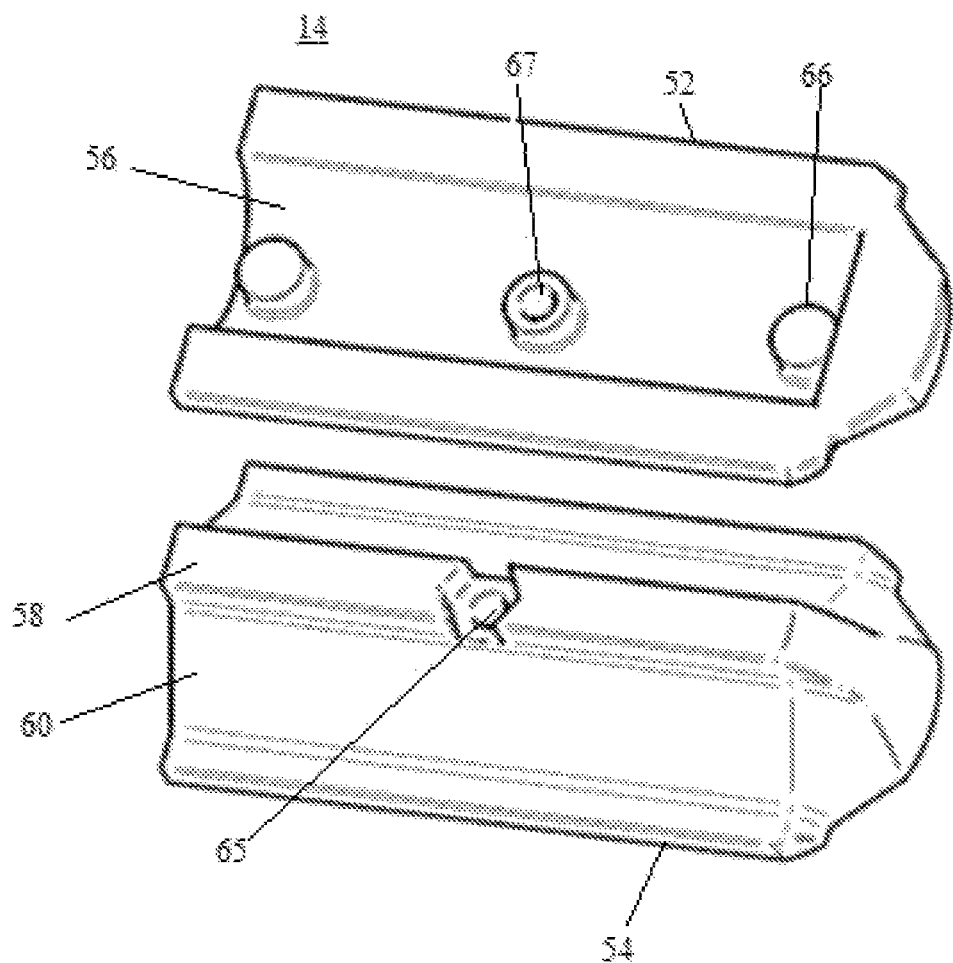
FIG. 4 is an isolated perspective front view of one embodiment of an adapter introduced in FIG. 1, with elements omitted for clarity.
Figure 5:
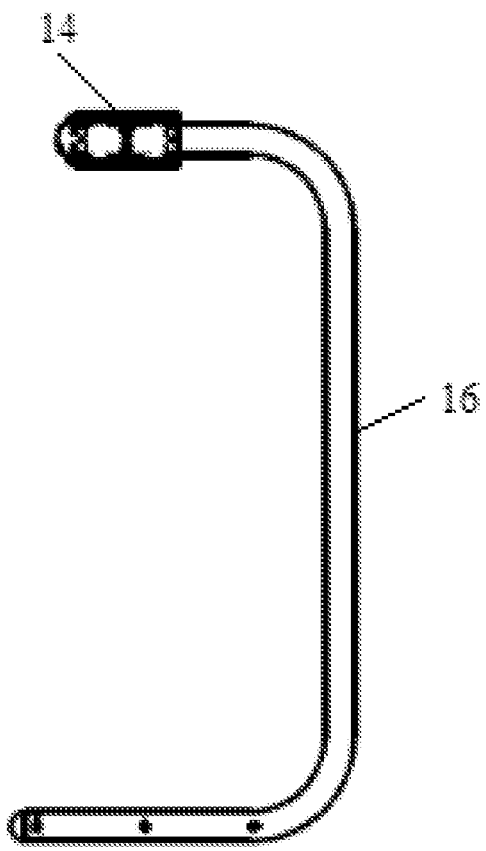
FIG. 5 is an isolated side view of one embodiment of a support leg introduced in FIG. 1.
Figure 5A:
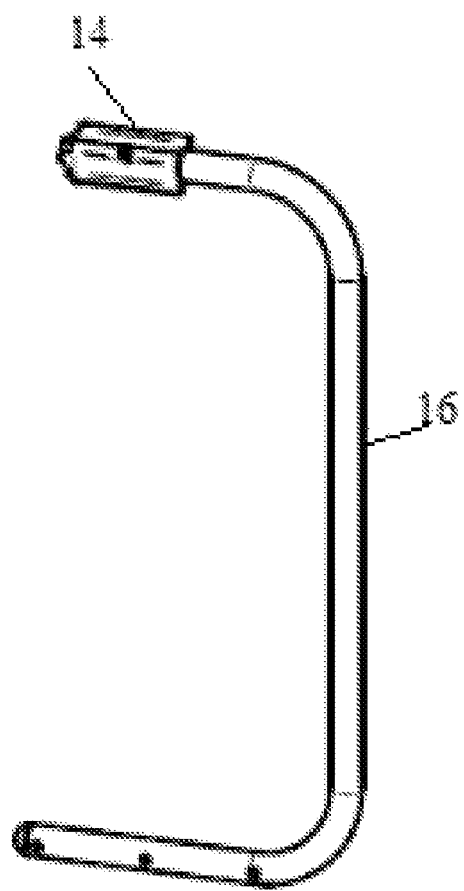
FIG. 5A is an isolated perspective rear view of one embodiment of a support leg introduced in FIG. 5.
Figure 5B:
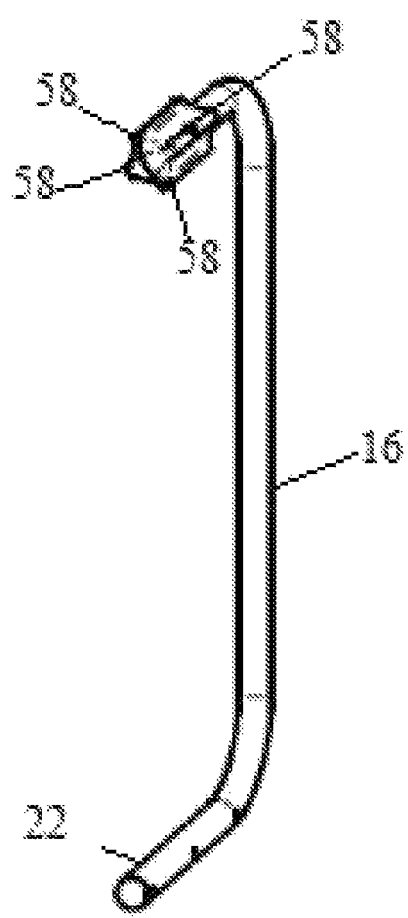
FIG. 5B is an isolated perspective front view of one embodiment of a support leg introduced in FIG. 5.
Figure 5C:
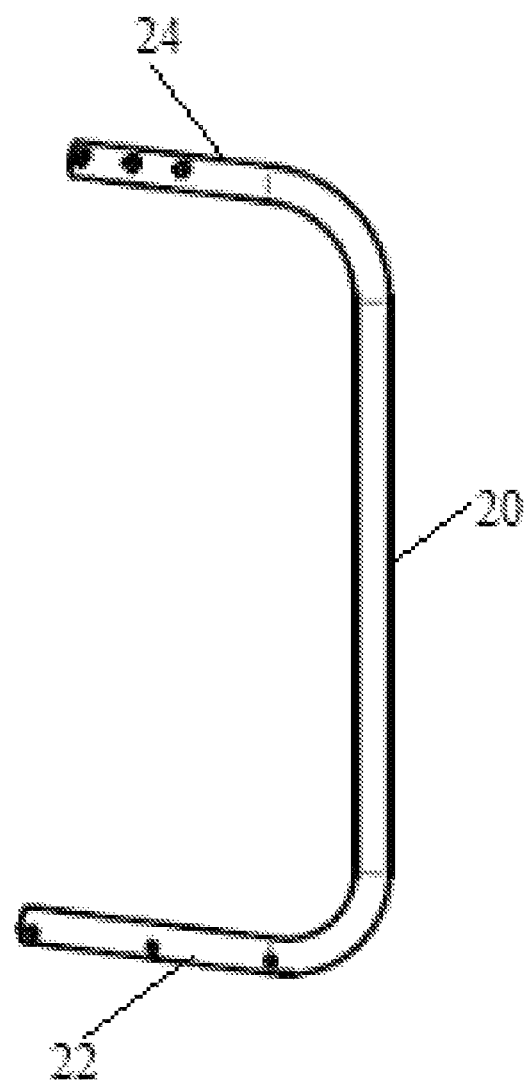
FIG. 5C is an isolated perspective side view of one embodiment of a support leg introduced in FIG. 5, with elements omitted for clarity.
Figure 5D:
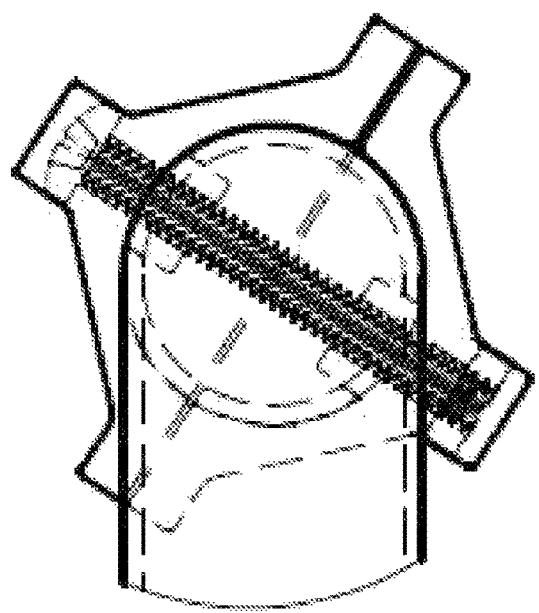
FIG. 5D is an isolated cross section view of one embodiment of a support leg assembly connection introduced in FIG. 5.

FIG. 4 shows an isolated embodiment of the separable adapter 14, wherein the inner face of first body 52 includes the receiving cavity 56 and mechanical engaging points 67, 66 to mate with corresponding mating points of the second body 54. The outer surface of the adapter typically includes at least one ridge to mate within any of the receivers shown and described herein. As shown in FIG. 4 and FIGS. 5-5D, the second body 54 includes ridge 58 having a planar top surface generally separated by a pair of walls 60. In particular embodiments, walls 60 include planar angled surfaces, including but not limited to substantially perpendicular arrangements, while other examples include concave and convex surfaces. As shown in FIG. 4, first body 52 and second body 54 may each provide one ridge and two partial ridges, whereby in a mating engagement the partial ridges define a plurality of complete ridges. In one example, the adapter includes a first, second, third, and fourth ridges 58, the first and second ridges 58 opposing one another and the third and fourth ridges 58 opposing one another, and the first and second ridges 58 being substantially perpendicular to the third and fourth ridges 58.

Figure 6:
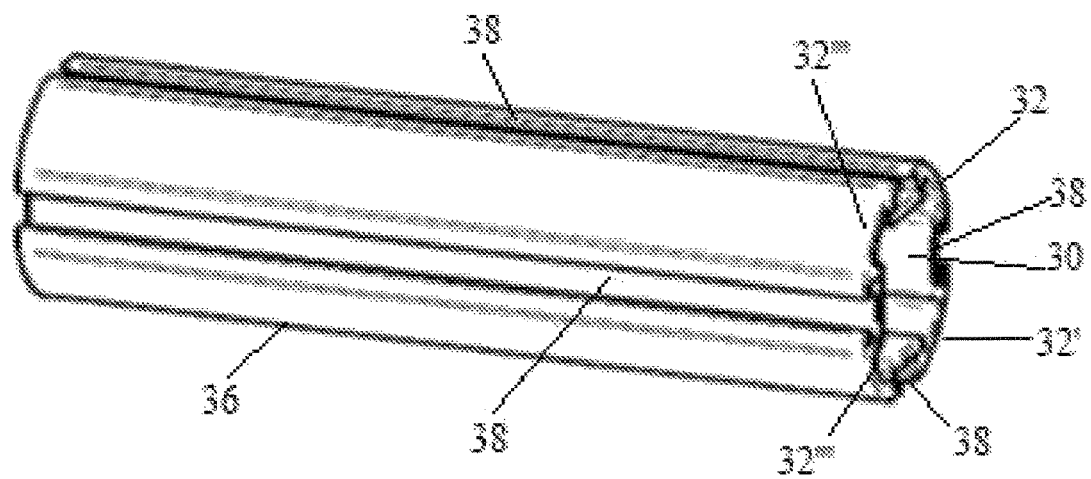
FIG. 6 is an isolated perspective side view of one embodiment of a receiver introduced in FIG. 1.
Figure 6A:
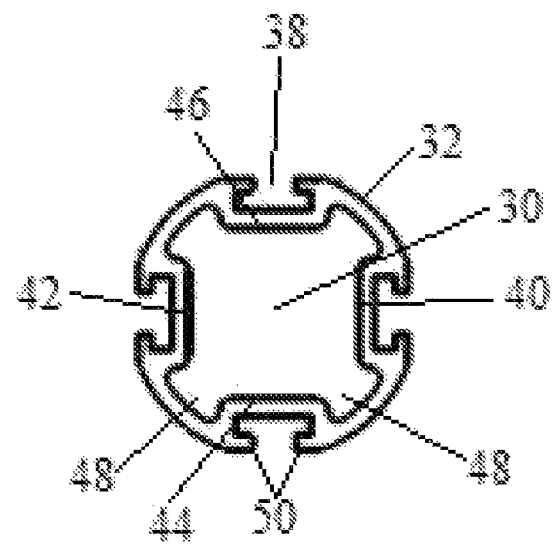
FIG. 6A is an isolated cross section view of one embodiment of a receiver introduced in FIG. 6.

The receiver(s) may be positioned and secured to a watercraft in a variety of configurations and orientations. As shown in FIGS. 6 and 6A, embodiments of knuckle receiver 12 includes inner channel 32 and a plurality of inner recessed cavities 48 extending from channel 32. The inner channel has a diameter to receive shaft sections and adapter features shown and described herein. In particular examples, channel 32 includes a substantially squared perimeter, having perpendicular adjacent sides 40, 44, 42, and 46. Other embodiments may include non-rectangular geometrical channels, for instance to mate with a variety of interchangeable adapters, including non-rectangular interchangeable adapters.

As further illustrated, the inner recessed cavities 48 may be grooves, and the like, that are spaced along distinct circumferential locations of channel 32. In one embodiment, four grooved recessed cavities 48 communicate with channel 32 along its length and arranged in a generally cloverleaf configuration. In this example, the inner recessed groove cavities 48 may include a central diameter that is larger than a length of an entry between the respective sides of the channel, for instance to establish a groove recess to receive elements and prevent any of the rotation shown and described herein. As further shown, the inner channel 32 and/or plurality of inner recessed cavities 48 may span the entire length of the receiver 12 to reduce, or even eliminate, integration concerns associated with feeding modules through the front face of the receiver. While alternative examples may include partially spanning channels and/or recesses along the receiver.

Figure 6B:
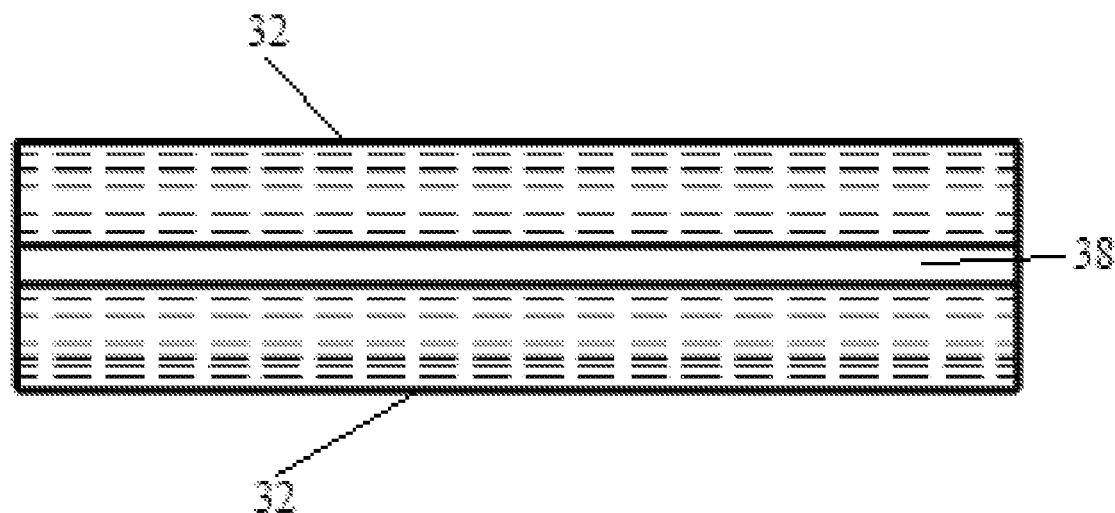
FIG. 6B is an isolated side view of one embodiment of a receiver introduced in FIG. 6.

The outer surface of receiver 12 may include a series of extensions spaced between recessed slots. As shown in FIGS. 6-6B, the exterior surface of receiver 12 may have a first 32, second 32', third 32", and fourth 32'" extensions, wherein the first 32 and second 32' extensions oppose one another, and the third 32" and fourth 32'" extensions oppose one another, and the first 32 and second 32' extensions are substantially perpendicular to the third 32" and fourth 32'" extensions. Recessed slots 38 are generally aligned between adjacent extensions and span along a length to receive and retain additional mounting accessories and equipment as recognized by those skilled in the art having the benefit of this disclosure. As shown in FIG. 6A, recessed slot 38 may have a closed bottom, opposing sides, and a substantially open face. The open face may have a pair of recessed rails 50 running substantially parallel to one another.

In any of the embodiments herein, the channel and recessed cavities matingly receive the support leg's adapter and associated ridge to align the wheeled support leg in multiple, removable positions. For instance, ridge 58 may engage with a first recessed groove cavity 48 to define a first position, and ridge 48 may engage with a different, for instance adjacent, angularly downstream, angularly upstream, or the like, recessed groove cavity 48 to define a second position. Thus the second position may be angular offset from the first position to define any of the extended, retracted, and partially retracted positions shown and described herein.

Further, the adapter 14 and ridge 58 may engage within the receiver's channel 30 and recessed groove cavity 48 to generally impede movement of the wheeled support leg. Still further, the adapter 14 and ridge 58 may engage within the receiver's channel 30 and recessed groove cavity 48 to generally prevent rotation of the wheeled support leg about the watercraft.

Figure 7:
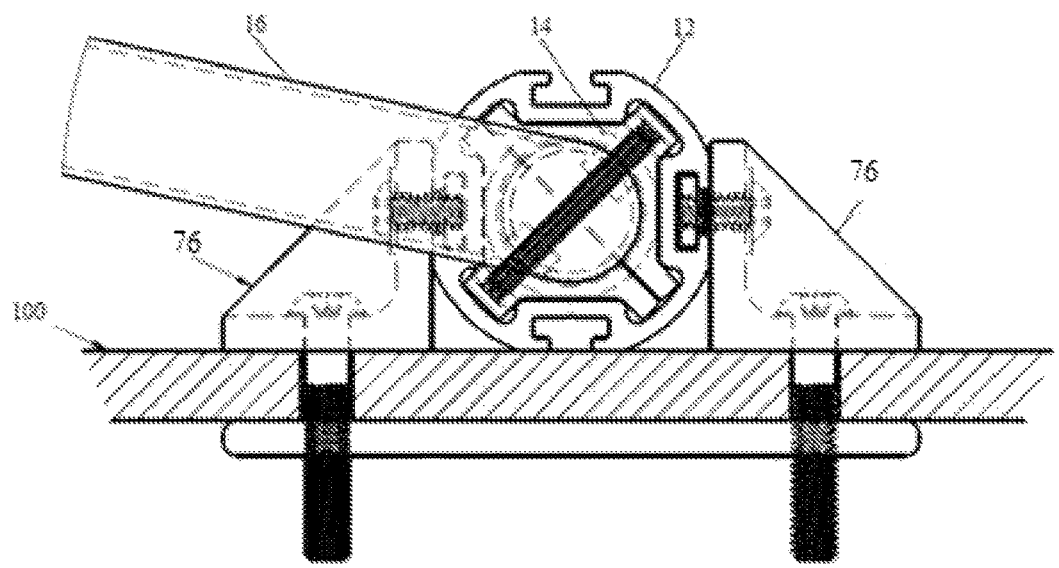
FIG. 7 is a cross section view of the wheel assembly embodiment of FIG. 1.
Figure 8:
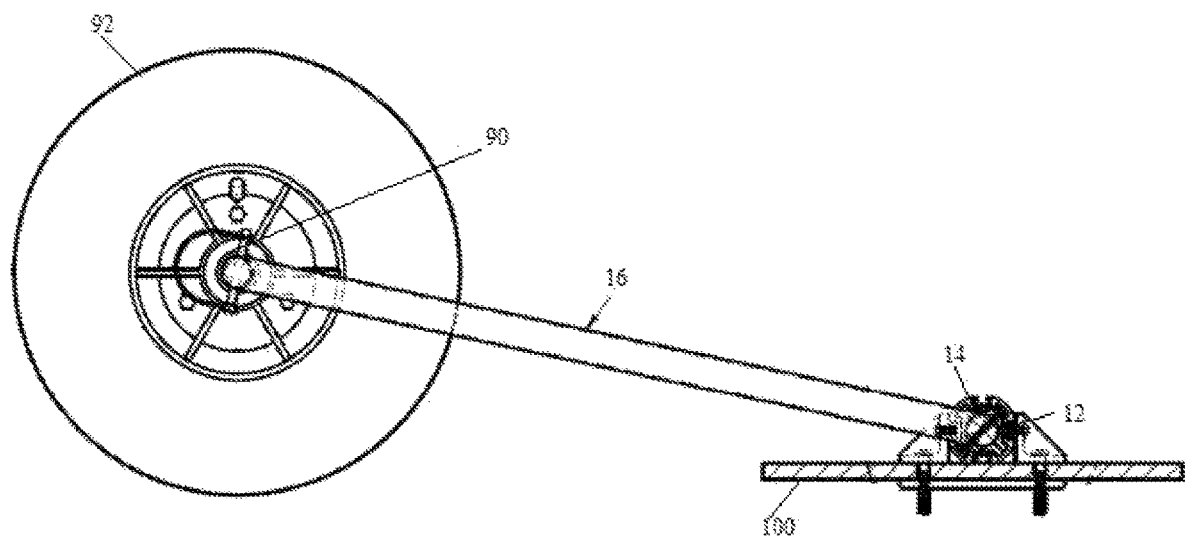
FIG. 8 is a side view of a wheel assembly embodiment introduced in FIG. 2.

As shown in FIGS. 2, 7, and 8, channel 30 and the communicating recessed cavity grooves 48 are exposed at an outer face to receive the wheeled leg 16 in both the extended and retracted positions. Applicant has unexpectedly discovered the outwardly exposed channel 30 and grooves 48 improve ease of alignment and improve interchangeability between components and between positions. However, it is within the sprit of this disclosure for the receivers to be configured in a variety of interchangeable arrangements for mounting of a variety of particular modules.

In particular examples a central arm may span between opposing receiver assemblies for enhanced stability and the like. For instance, as shown in FIGS. 2A and 9, a central arm 74, for instance a rod, support, block, or similar, is telescopically insertable into receiver through an open inner face of each of the pair of receivers 12. In particular examples, central arm 74 is sized to fit within the channel 30, and set screws or other clamping means, may secure the central arm 60 in position.

FIG. 9 illustrates one embodiment of a universal wheel assembly 10 mounted on a watercraft 100 in a retracted position. As shown, the universal wheel assembly may be mounted toward the stern of a kayak 4, for instance behind the cockpit, whereby the cockpit will be unobstructed by the assembly in a retracted position.

FIG. 10 illustrates one embodiment of the arrangement introduced in FIG. 9 in a vehicle 200 for transport in a generally retracted position. As shown, the universal wheel assembly 10 improves manipulation of the watercraft 100, for instance during loading and unloading from the vehicle 200, vehicle bed, vehicle compartment, rack, and the like.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A retractable wheel assembly adapted to support and transport a watercraft, said assembly comprising:
   a. a receiver secured to an upper surface of said watercraft, said receiver comprising a plurality of extensions;
   b. an adapter repositionable within said receiver between a first position and at least a second position angular offset from said first position; and
   c. an elongated leg having a proximate portion secured to said adapter and having a distal wheel, and
      wherein said adapter having a first body with an inner cavity and a second body with an inner cavity, whereby said first body and said second body adapted to receive said proximate portion.

2. The assembly of claim 1, wherein said adapter being repositionable within said receiver's inner mating face.

3. The assembly of claim 1, wherein said first body having at least one ridge.

4. The assembly of claim 3, wherein said adapter includes a pair of substantially perpendicular walls and a substantially planar top surface.

5. The assembly of claim 1, wherein said elongated leg includes a proximate rail and an elbow adjacent a vertical portion.

6. The assembly of claim 1, wherein said elongated leg includes an axle.

7. The assembly of claim 1, wherein said elongated leg adapted to extend downward below a waterline of said watercraft.

8. The assembly of claim 1, wherein said elongated leg adapted to align substantially parallel to a waterline of said watercraft.

9. The assembly of claim 1, wherein said receiver's inner mating face includes a channel and a plurality of recessed cavities extending along at least a portion of a length of said receiver.

10. The assembly of claim 1, including a mounting bracket adapted to mechanically attach said receiver to an upper surface of said watercraft.

11. The assembly of claim 1, wherein said adapter being connectable to and disconnectable from said receiver, and whereby said adapter positioned in said receiver prevents rotation of said elongated leg.

12. A universal wheel assembly for transporting a watercraft, said assembly comprising:
   a. a first knuckle receiver and a second knuckle receiver spaced horizontally adjacent one another and adapted to be attachable to said watercraft;
   b. an adapter repositionable within each one of said knuckle receivers between a first position and at least a second position angular offset from said first position; and
   c. a pair of wheeled support legs having a proximate portion affixed to a respective one of said adapters and a distal portion supporting a wheel, and
      wherein said adapter having a first body with an inner cavity and a second body with an inner cavity, whereby said first body and said second body adapted to receive said proximate portion.

13. The assembly of claim 12, wherein said adapter being separable from said wheeled support leg.

14. The assembly of claim 12, wherein said adapter includes a plurality of ridges spatially offset from one another along a perimeter of said adapter.

15. The assembly of claim 12, wherein said support leg includes an elbow adjacent said proximate portion and a vertical portion.

16. The assembly of claim 15, wherein said proximate portion being substantially perpendicular to said vertical portion.

17. The assembly of claim 12, wherein said support leg includes an elbow adjacent said distal portion and a vertical portion.

18. The assembly of claim 12, including a central arm extending between said first knuckle receiver and said second knuckle receiver.

19. A retractable wheel assembly to support and detach from a watercraft, said assembly comprising:
   a. a knuckle receiver secured to said watercraft and comprising
      i. an inner mating face,
      ii. an exterior surface having a first, second, third, and fourth extensions, said first and second extensions opposing one another and said third and fourth extensions opposing one another and said first and second extensions being substantially perpendicular to said third and fourth extensions, and
      iii. a recessed slot spaced between adjacent extensions;
   b. an adapter comprising
      i. a first body having an inner cavity and at least one ridge,
      ii. a second body having an inner cavity and at least one ridge, and
      iii. a fastener releasably securing said first body about said second body; and
   c. an elongated leg comprising
      i. a proximate rail secured between said first body and said second body,
      ii. a distal rail adapted to secure a wheel.

* * * * *